UNITED STATES PATENT OFFICE.

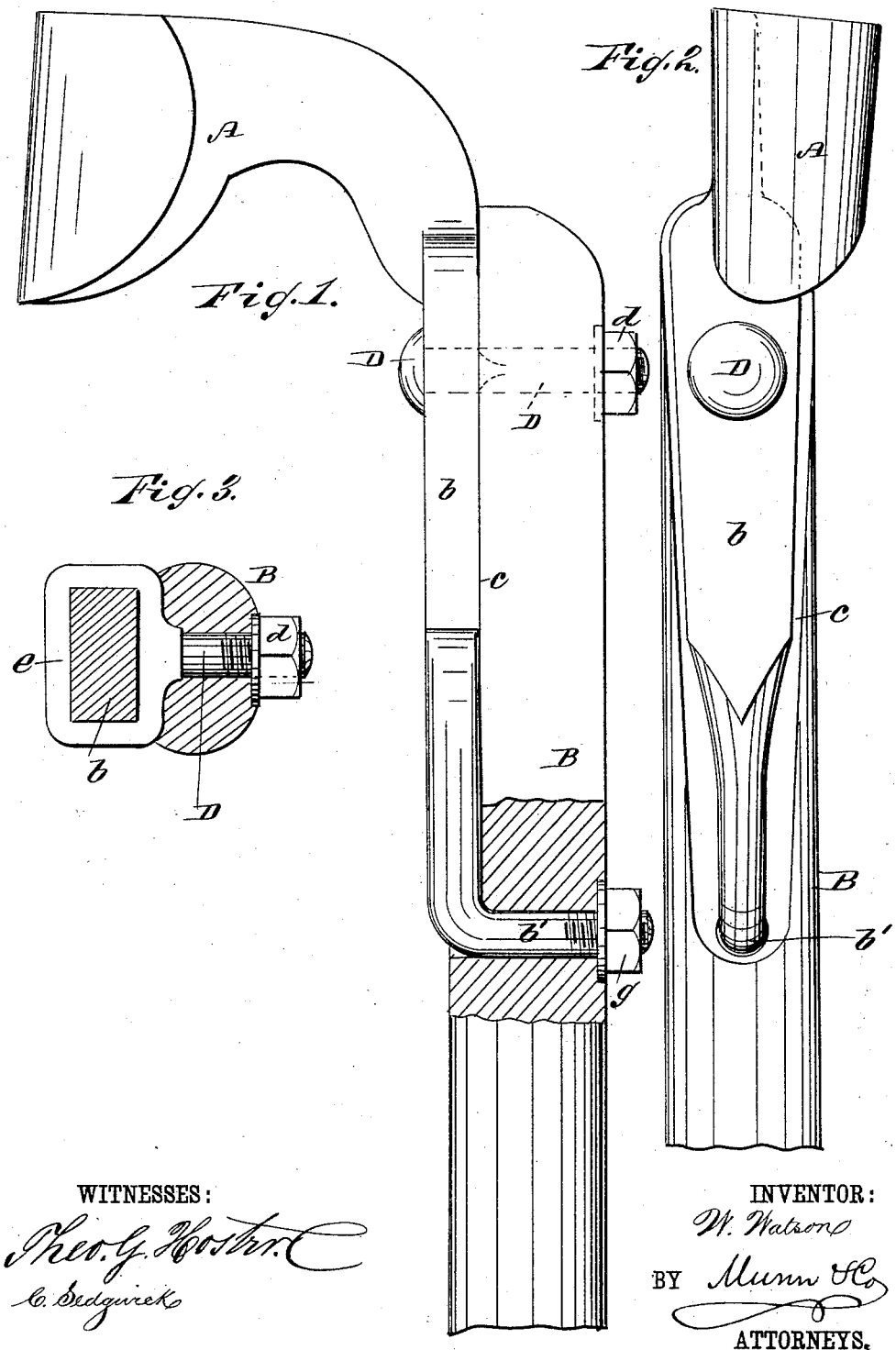

WALTER WATSON, OF FAYETTEVILLE, NORTH CAROLINA.

TURPENTINE-HACKER.

SPECIFICATION forming part of Letters Patent No. 327,207, dated September 29, 1885.

Application filed July 3, 1884. (Model.)

*To all whom it may concern:*

Be it known that I, WALTER WATSON, of Fayetteville, in the county of Cumberland and State of North Carolina, have invented a new and useful Improvement in Turpentine Hackers or Tools, of which the following is a full, clear, and exact description.

My invention relates to improvements in turpentine-hackers; and it consists in the peculiar construction and arrangement of parts, as hereinafter fully described, and pointed out in the claim.

Reference is to be had to the accompanying drawings, forming a part of this specification, in which similar letters of reference indicate corresponding parts in all the figures.

Figure 1 represents a partly sectional side view, and Fig. 2 a longitudinal front view, of a turpentine-hacker, and its handle, in part, embodying my invention. Fig. 3 is a transverse section through the handle and shank of the tool, showing a modified construction of one of the fastenings.

A is the hacking-tool, the shank $b$ of which is integral therewith, and is constructed to lie flat or close throughout its length on a reduced flattened portion, $c$, of the handle B of the tool, said shank being of a flat configuration for a portion of its length, but of rounded form at its inner end, where it is bent, as at $b'$, and made to pass and project through a hole in the handle. This bent portion $b'$ of the shank has a screw-thread cut upon it for attachment of the tool to the handle by means of a nut, $g$, screwed onto the projecting threaded bent end $b'$ of the shank. The outer end portion of the shank $b$ is also secured to the handle by a separate screw-bolt, D, and nut $d$, said bolt either being a solid-headed one and passing through both the shank and handle, as shown in Figs. 1 and 2, or being made with a cuff or strap-head, $e$, receiving the shank $b$ of the tool through it, and the body of the bolt only passing through the handle B, as shown in Fig. 3.

I am aware that a scoop has been secured to its handle by means of an eyebolt at the end of the handle, through which the shank passes, and by nuts on the screw-threaded bent portion of the shank, which nuts take upon opposite sides of the handle after the said screw-threaded bent portion has been passed through a slot in the handle; and I am also aware that a scythe-blade provided with a slot and an aperture has been secured to its snath by bolts, and therefore do not claim such inventions.

Having thus described my invention, I claim as new and desire to secure by Letters Patent—

The hacking-blade A, provided with the shank $b$, having a flat configuration for a portion of its length, and its end $b'$ rounded, bent, and screw-threaded, in combination with a handle provided with apertures, and having a reduced flattened portion, $c$, corresponding to the flattened portion of the shank, to receive and firmly support the same throughout its length, the nut $g$ on the end of the screw-threaded bent end, and the bolt and nut D $d$, substantially as herein shown and described.

WALTER WATSON.

Witnesses:
G. P. McNEILL,
E. F. MOORE, Jr.